United States Patent [19]

Huang et al.

[11] Patent Number: 5,595,778
[45] Date of Patent: Jan. 21, 1997

[54] PIE DOUGH WITH REDUCED DEGREE OF CRACKING

[75] Inventors: Victor T. Huang, Moundsview; Karen V. Sandifur, St. Paul, both of Minn.

[73] Assignee: The Pillsbury Company, Minneapolis, Minn.

[21] Appl. No.: 473,672

[22] Filed: Jun. 7, 1995

[51] Int. Cl.$^6$ ............................... A21D 8/00; A21D 8/02
[52] U.S. Cl. .................. 426/556; 426/496; 426/549; 426/390; 426/391
[58] Field of Search .................................. 426/390, 391, 426/496, 549, 556

[56] References Cited

U.S. PATENT DOCUMENTS

| | | | |
|---|---|---|---|
| 2,392,995 | 1/1946 | North et al. | 99/123 |
| 3,057,730 | 10/1962 | Morck | 99/86 |
| 3,116,149 | 12/1963 | Luedtke | 99/92 |
| 3,294,547 | 12/1966 | Koolstra | 99/92 |
| 3,692,535 | 9/1972 | Norsby et al. | 99/92 |
| 4,297,378 | 10/1981 | Haasl et al. | 426/532 |
| 4,904,493 | 2/1990 | Petrizzelli | 426/549 |
| 5,270,065 | 12/1993 | Schanno | 426/556 |

OTHER PUBLICATIONS

Baking Science & Technology Third Edition by Pyler, vol. II, published by Sosland Publishing Company, Merriam, KS 66202 (1988).

American Society of Bakery Engineers, proceedings of the 36th annual meeting Mar. 7–10, 1960, Edgewater Beach Hotel, Chicago, IL.

*Primary Examiner*—Esther Kepplinger
*Assistant Examiner*—Choon P. Koh
*Attorney, Agent, or Firm*—Janal M. Kalis; Aleya Rahman

[57] ABSTRACT

The present invention includes a method for making dough for use as a pie crust made by emulsifying fat and a water slurry to make an emulsion and adding the emulsion to a preblend containing flour. The present invention also includes a dough product made by the process.

11 Claims, 5 Drawing Sheets

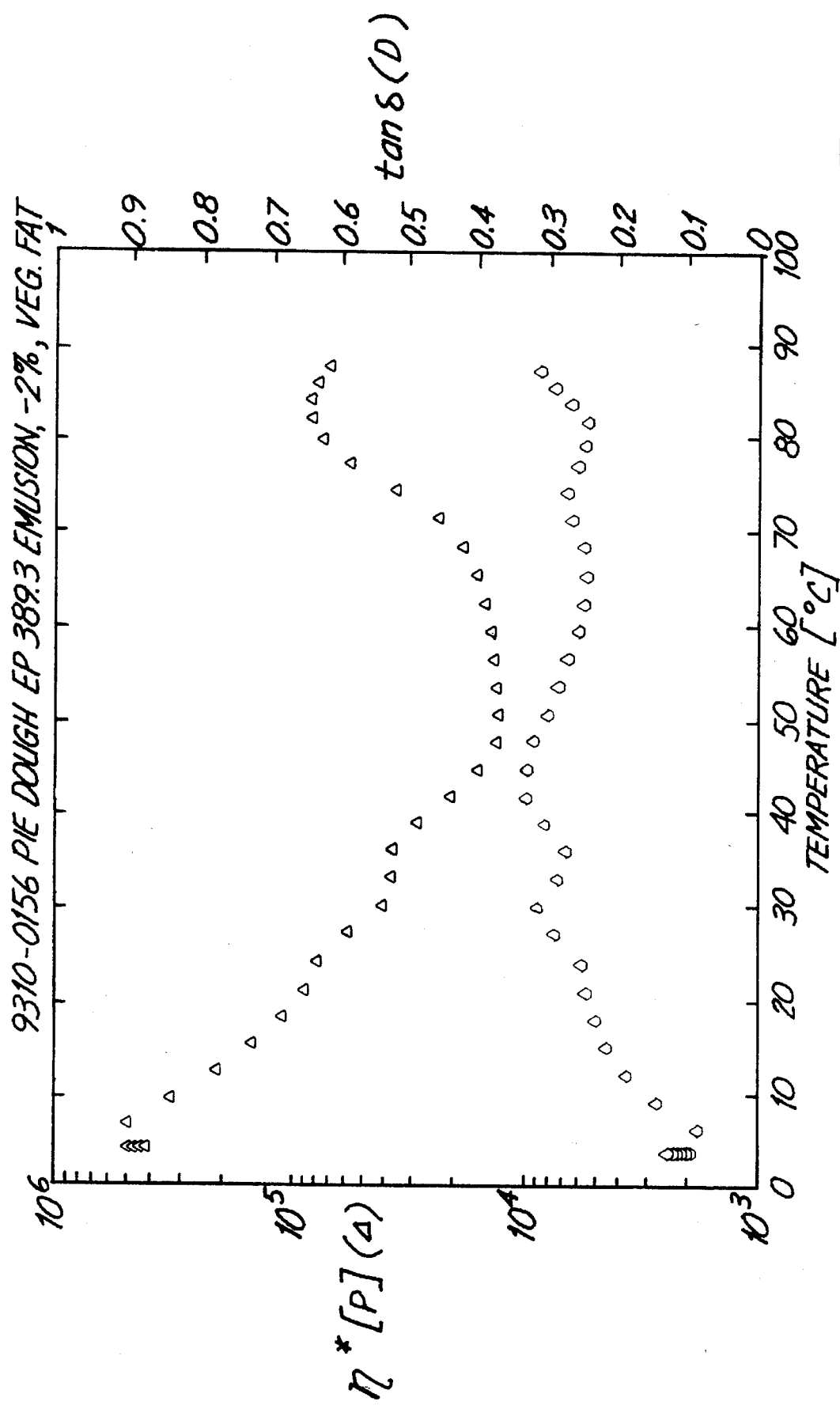

PIE DOUGH WITH REDUCED DEGREE OF CRACKING

BACKGROUND OF THE INVENTION

The present invention relates to a pie dough with a reduced degree of cracking.

From the spectrum of home bakers to restaurant dessert chefs to food manufacturers is a shared experience that the act of making a pie crust of consistently acceptable texture, flavor, and color is both elusive and frustrating. Even though pie crust dough is made from a relatively simple recipe of ingredients that includes flour, lard or shortening, water and salt, the dough and resulting crust may have a wide range of physical and organoleptic features.

Pie crusts are typically evaluated on the basis of texture. The American Society of Baking Engineers in the Proceedings of the Thirty-Sixth Annual meeting held Mar. 7–10, 1960, at pages 292–303, described textures of baked pie crusts and corresponding pie crust doughs. Textures of pie crust range from mealy, to semiflaky, to flaky, to extra flaky. Flakiness or mealiness of a pie crust is largely dependent upon temperature, type and concentration of shortening as well as the method for blending shortening with flour.

The Baking Engineers described the easiest and most forgiving type of pie crust to make as a mealy crust. To make the mealy crust, a baker thoroughly blends shortening and flour together before water is added. The thorough blending makes a dough that is homogeneous. The baked mealy pie crust is a strong crust but is pale in color and lacks flakiness.

A flaky crust is made by preparing a laminated dough. The laminated dough is made by under-mixing shortening and flour in order to form small "pills" of shortening in flour before water is added. Typically, the temperature of shortening and flour is between about 55 and 60 degrees Fahrenheit. Cold water is added to this under-mixed mixture to make the laminated dough. This laminated dough is baked to a flaky crust. The flaky crust has a golden brown color and a crisp and flaky texture. Semi-flaky and extra-flaky crusts are also made by under-mixing the shortening and flour to form pills that are smaller and larger, respectively, than pills for a flaky crust. As can be appreciated, it is exceedingly difficult to consistently prepare the optimal degree of under-mixing of shortening and flour to make a dough for a flaky crust.

Other undesirable consequences of improperly blending the shortening or lard with the flour is a non-uniformity of the blend and the color of the crust as well as a presence of large chunks of shortening or lard in the dough.

The problems associated with making pie doughs having consistently desirable qualities are intensified in commercial pie dough manufacture. Not only are there problems associated with degrees of under-mixing in a single batch of pie dough, subsequent processing steps also affect the characteristics of the dough and ultimately the final pie crust texture. Commercial pie doughs are typically made by mixing the dough ingredients, sheeting the dough and the cutting the dough into appropriate pieces having sizes and shapes desired for pie crusts. Optionally, for efficient packaging and handling, the dough pieces are folded prior to being packaged. Prior to being folded, the pieces of dough are usually sandwiched between two sheets of paper, such as wax paper or parchment paper. Not only does folding permit easier packaging, sandwiching the dough between sheets of paper makes the dough easier to handle by the consumer. For example, a circular piece of dough which has been folded into a quarter wedge (i.e. folding the circular dough once along its diameter, and then once along its radius perpendicular to the first fold) can be used by the consumer simply by unfolding the quarter wedge, removing one sheet of paper, placing the dough, paper side up, in the pie pan or on top of the filling and then removing the second sheet of paper. The sheets of paper make the dough less susceptible to stretching or breaking off at the edges.

After commercial pie doughs are packaged, they are typically stored in colder than ambient conditions to prevent or retard microbial damage or other types of food spoilage. The doughs can be refrigerated or frozen, or may be stored first under frozen conditions for more extended periods of time, followed by refrigerated storage as the pie doughs enter the distribution channel and ultimately end up with the final consumer.

Because of the fragile dough structure, particularly after the dough has been stored for a period of time under refrigerated or frozen conditions, folding creates problems in commercial pie doughs. Folded pie doughs often crack along the folds when the dough is unfolded by the consumer. Cracking is especially pronounced in pie doughs containing vegetable fat based shortenings. It is believed that the cracking occurs mainly due to the traditional under-mixing of the dough ingredients described above. A problem exists, therefore, in balancing the under-mixing needed to obtain a desirably flaky crust and overcoming cracking in the dough.

Other undesirable pie crust outcomes include crust "slump" and crust sogginess. Slump occurs when the pie dough placed in a pie pan is baked without a filling, usually to prepare a pie crust that is suitable for filling with unbaked fillings such as meringue or cream fillings. When the dough is baked without a filling, the dough "slumps" or deforms severely during the baking process. This deformation has been observed to occur on more than one side of the dough in the pan. The slumping is usually to such an extent that the resulting baked product is unsuitable for use as a crust since the deformed side or sides will not be able to hold filling once the filled pie is removed from the pan for serving. Therefore, a "slumped" pie crust is essentially unusable for its intended purpose. It is believed that slumping occurs due to dough shrinkage during baking, which may be related to dough sheeting, and is a particularly difficult problem that has plagued commercial pie dough producers for several years.

Another problem with pie crusts is a wet or soggy bottom- or under crust. The wet or soggy under crust occurs when moisture from the filling migrates into the under crust before the under crust structure has set during baking. The additional moisture from the filling prevents the under crust from developing a flaky or rigid texture during baking.

Yet another undesirable outcome often observed in commercial pie doughs that have been stored for extended periods of time is the formation of shortening "lumps" on the surface of the dough. Typically, as described above, pie doughs are undermixed to provide the desired flaky crust when baked. Undermixing results in non-uniform distribution of the fat material used to make the dough. In homemade pie doughs, shortening lumps are usually not observed since the baker typically rolls out the dough and very soon thereafter bakes the dough. Upon baking, of course, the fat material melts and forms the flaky, laminated crust.

In commercial pie doughs, however, a significant amount of time can pass between when the dough is first rolled out and when it is actually baked. In some cases, this period of time can exceed 12 months. During this period, the fat material can form lumps that appear on the surface of the dough, giving it an undesirable appearance. Upon baking, the fat lumps melt away, but often consumers will simply not use a dough that has lumps on its surface and will discard such a product.

Over the years, there have been a number of attempts to improve the process of making pie crust and the crust products. The Luedtke patent, U.S. Pat. No. 3,116,149 issued Dec. 31, 1963, describes a method for preparing a pastry dough that utilizes a pourable shortening. The pourable shortening ranges in concentration from about 35% to 80% of the flour content. The method also includes combining water with flour to develop gluten in the flour. Next, the pourable shortening is added to the flour-water mixture.

The Koolstra patent, U.S. Pat. No. 3,294,547 issued Dec. 27, 1966, describes a pastry dough of low moisture. The moisture content of this dough is about 10% to about 25% by weight.

The Norsby et al. U.S. Pat. No. 3,692,535 issued Sep. 19, 1972, describes a pastry dough that includes a fraction of developed wheat gluten in addition to shortening, flour and water. This dough additionally included a glycerine component. The Haasl et al. U.S. Pat. No. 4,297,378 issued Oct. 27, 1981, describes a dough composition that includes a high starch, low enzyme flour, shortening, water, gluten and preservatives. The composition is used in making pie dough which, during manufacture, is pre-sheeted and folded twice for packaging and then is unfolded by the consumer for use.

SUMMARY OF THE INVENTION

The present invention includes a method for making a pie dough having a deformability at or below processing or room temperatures effective to prevent cracking of the dough and having a deformability at baking temperatures effective to prevent slumping. The method includes a step of providing a fat material such as shortening, lard or oil in a quantity effective to make a pie dough, preparing a slurry that includes water in an amount effective to make the pie dough, combining the fat material with the slurry, emulsifying the fat and slurry to form an emulsion, and mixing the emulsion with a preblend that includes flour. The present invention also includes the dough product and baked crust made by this process.

DESCRIPTION OF THE DRAWINGS

FIG. 5 shows a graphical view of viscosity versus temperature for a –2% emulsion pie dough of the present invention made with vegetable shortening.

DETAILED DESCRIPTION OF PREFERRED EMBODIMENTS

Figure 1:
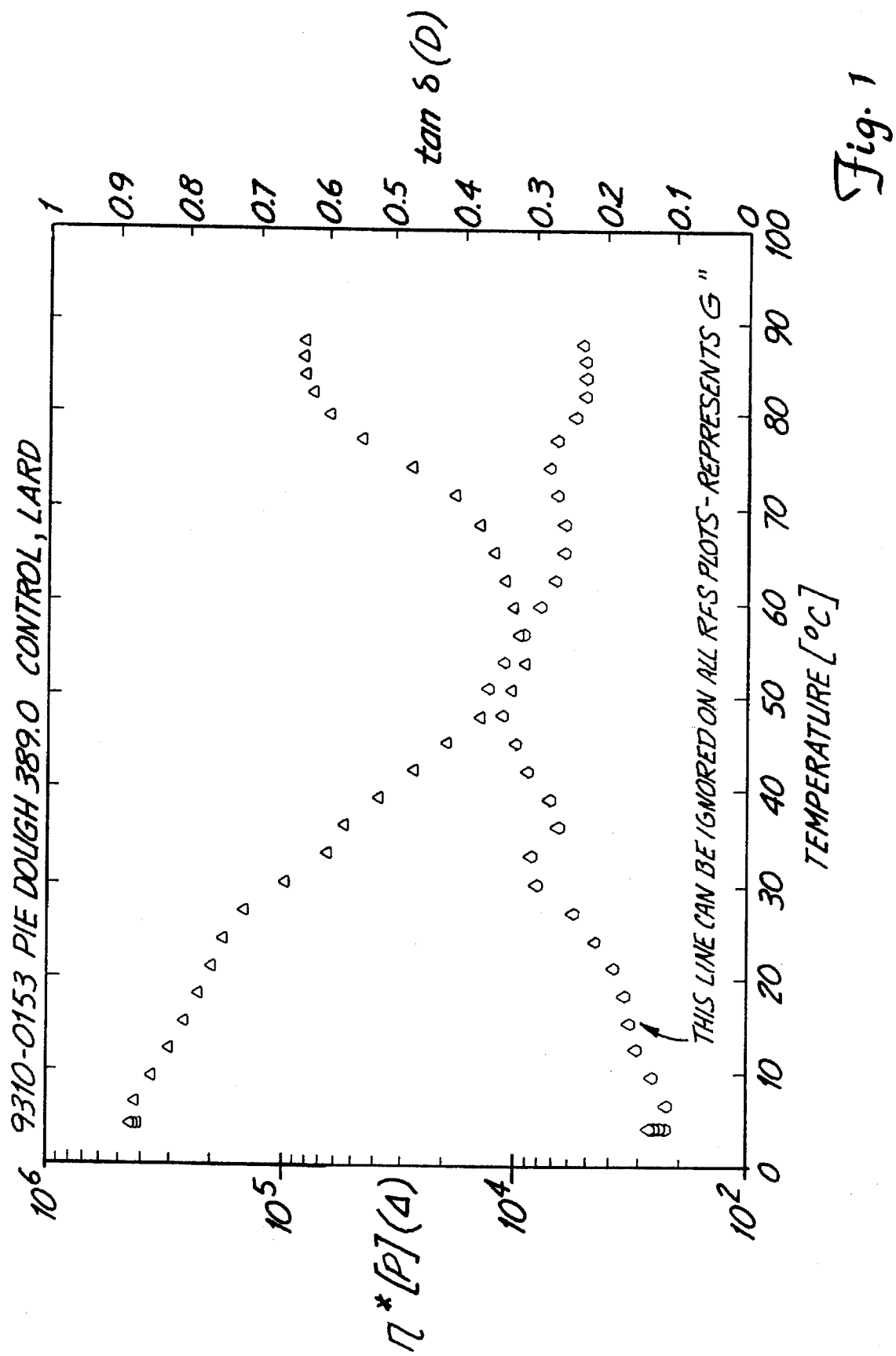
FIG. 1 shows a graphical view of viscosity versus temperature for a control pie dough made with lard.

The method of the present invention makes a pie dough that has a deformability at or below processing or room temperatures effective to prevent cracking of the dough and that has a deformability at baking temperatures effective to prevent slumping. The method includes providing an emulsion of a fat material and a water-based slurry, then combining this emulsion with a flour-containing preblend to make a pie dough. The present invention also includes a pie dough with a greater deformability at processing temperatures as compared to conventional pie doughs and a lower deformability at baking temperatures as compared to conventional pie doughs. The present invention also includes a flaky baked crust having a fat concentration of about 25% by weight.

It has surprisingly been found that by emulsifying a fat material with a water-based slurry, a number of improvements can be obtained in physical and organoleptic properties in both a pie dough and the final baked crust product. One major advantage of making pie doughs using the method of the present invention is that folded pie doughs show significant reductions in cracking when unfolded prior to use.

By emulsifying the fat component with the water slurry, it has also been found that a wider variety of fats, such as lard, shortening or any type of oils can be used to make the pie crust. For instance, vegetable shortening and other shortenings that are kosher or free of cholesterol are suitable for use in the method of the present invention. Additionally, edible oils may be used in this invention. It has surprisingly been found that by emulsifying these fats with the water slurry, an all-vegetable fat pie dough may now be used to make a flaky crust from a dough with reduced cracking. Any amount of fat suitable to make a pie crust may be used to make the dough of the present invention, ranging from as low as about 0.5% to about 50% wt-%.

Further, it has been found that a significantly reduced amount of fat, such as lard, is necessary in the method of the present invention to make a flaky crust as compared to conventional methods. Whereas conventional methods require a shortening concentration of about 30% by weight in the dough to make a flaky baked crust, a flaky crust can be obtained by the method of the present invention with a concentration of lard of about 25% by weight.

The quantity of water is also reduced in the method of the present invention. Whereas a conventional recipe requires about 18% water by weight to make a pie crust dough, the method of the present invention has a water concentration of about 17%. Other components typically slurried with the water include conventional preservative, flavoring or coloring ingredients such as salt, xanthan, potassium sorbate, sodium propionate and coloring agents. The levels of these components can vary depending on the type of dough and crust characteristics desired, and can be present in about the same levels as in a conventional pie dough.

The method of the present invention also includes providing a preblend containing flour and some form of starch such as wheat starch. In one embodiment, the flour concentration is 45% by weight of the preblend and the wheat starch is 55% by weight of the preblend. The emulsion is added to the preblend and the combined ingredients are mixed to form a dough.

One significant improvement resulting from the emulsifying step is that cracking upon unfolding a dough made by the method of the present invention is of a degree that is substantially less than conventional doughs. By a "conventional dough" is meant a dough that is prepared by the addition of shortening to a combination of flour and wheat starch to make a shortening-flour blend. Water and other ingredients are then mixed with this shortening-flour blend.

It is believed that the reduced cracking occurs because the dough made by the emulsion process is more fluid and deformable when subjected to a shear stress and more uniform than conventional doughs prior to baking. It is believed that the increased deformability and uniformity reduce the amount of cracking when the pie dough is unfolded. This is especially apparent in all-vegetable shortening pie doughs, which often form large cracks upon unfolding. These cracks can be of such a length that the crust is no longer suitable for use. Pie doughs made by the method of the present invention, including all-vegetable shortening pie doughs, however, show significant reductions in overall cracking when the dough is unfolded, and even if cracks occur, they are much smaller than in conventionally made pie doughs, usually in the order of only a few millimeters in length.

Although the pie dough made by the emulsion method of the present invention is more deformable and more uniform, the crusts resulting from baking the dough are tender and flaky, even at low amounts of fat and water.

It has also surprisingly been discovered that pie doughs made by the method of the present invention also show reduced slump during baking, despite the fact that the pie dough is more deformable at processing or room temperatures. Because the method of the present invention permits the use of a lower percent of moisture and fat, a baking pie crust will slump less than conventionally prepared crusts. Further, the method of the present invention can produce a baked undercrust with fewer soggy and wet areas than a conventional crust.

It has been found that the dough made from the emulsified mixture is more rigid during the baking temperature range in which slump typically occurs. Consequently, slump is substantially reduced. This increased rigidity during baking also results in undercrusts having fewer soggy or wet areas as compared to conventional doughs.

It is believed that the increased rigidity at these baking temperatures may result, in part, from the lower moisture and fat concentrations required in the emulsified material. Interestingly, however, doughs made from a recipe with a moisture and fat content similar to the doughs made from the method of the present invention but not using the emulsification method, have less rigidity than the doughs made by the process of the present invention.

Another advantage of a pie dough made by the method of the present invention is a reduction in lump formation on the surface of the dough. It has been found that because the fat material is more uniformly distributed, the size of the lumps has been significantly reduced. It is believed that the temperatures of the pie dough ingredients may also play a role in reducing the size of the lumps. In one experiment, when the fat material and the water-based slurry were both at ambient temperatures, the lump size was significantly reduced as compared to a pie dough made by emulsifying a hot fat material and a cold water-based slurry.

It has been found that an "emulsion" dough made by the method of the present invention, with the same moisture and fat concentration as a conventional dough, may be too deformable at ambient temperature for commercial processing or consumer handling. By reducing the percent of emulsion by weight of the dough, and increasing the percent of preblend by weight of the dough, the emulsion dough processes better during sheeting and folding than a conventional dough, and results in a dough that is easier to handle by consumers. Preferably, the emulsion concentration is reduced by an amount which makes the dough less deformable, but not so much that the dough and resulting crust lack the desired reduced cracking and organoleptic attributes such as flavor and texture. More preferably, the emulsion component concentration of the dough is reduced by about 1% to 5% by weight of the dough as compared to the total shortening and water concentrations of a conventional pie dough. Most preferably, the emulsion component concentration of the dough is reduced by about 2% to 4% by weight of the dough.

The temperature of the ingredients when they are combined may also affect the processability of the resulting pie dough. The temperature of the fat material is usually the highest of all the ingredients because the fat is preferably melted to make a uniform emulsion. The temperature of the fat material can vary depending on the melting profile of the particular fat material used. In some embodiments, the temperature of the fat material can range from about 60° F. to about 120° F. prior to being combined with other ingredients. A preferred temperature range is from between about 70° F. to about 120° F. The temperature of the water-based slurry can also vary depending on the temperature of the water used. Depending on the ingredients added to prepare the slurry, the water temperature can affect the uniformity of the slurry. In preferred embodiments, the slurry temperature can range from about 20° F. to about 80° F., preferably between about 20° F. to 50° F.

The emulsion resulting from emulsifying the fat material and the slurry has a temperature that is dependent on the temperature of each of the emulsion components. The emulsion temperature can range from about 40° F. to about 100° F., preferably between about 45° F. to 75° F.

The preblend can be provided at any temperature suitable to make a dough, but is preferably at a temperature lower than the emulsion temperature to result in a dough having a temperature suitable for processing. The preblend temperature can range from about −60° F. to about 45° F., preferably between about −30° F. to about 35° F.

The resulting dough temperature should be at a level that makes the dough easy to process without requiring significant expensive cooling equipment. Preferably, the resulting pie dough is at a temperature of between about 50° F. and 80° F., more preferably between about 55° F. and 75° F. It was discovered that combining a cold emulsion having a temperature between about 45° F. and 75° F. and a cold preblend having a temperature between about 35° F. and 45° F. resulted in a preferred pie dough having a temperature of between about 60° F. and 75° F., which showed improved processability and handling prior to packaging and desired organoleptic qualities, such as tenderness and color, upon baking, when compared to doughs made with emulsions and preblends at higher temperatures. Using a cooler emulsion permits the preblend to be added at a relatively higher temperature to result in a suitable pie dough temperature without the need for additional preblend or dough cooling equipment. Typical ambient processing temperatures usually are preferably less than 80° F., and are more preferably between 60°–75° F.

Any type of processing setup can be used to prepare the dough of the present invention. One preferred setup is an in-line homogenizer/mixer/blender setup. Other types of equipment setup are suitable for use with this invention.

It has been discovered that pie doughs made by the method of the present invention generally have a temperature-dependent rheological profile that differs from that of conventional pie doughs due to the emulsification step. While not intending to be bound by theory, it is believed that the changes in the rheological profile observed in the dough made by the emulsion method provide a more deformable texture at lower temperatures and a more rigid texture at higher temperatures, when compared with conventional pie doughs. It is believed that the increased deformability at lower temperatures reduces or eliminates cracking when a folded pie dough made by the present invention is unfolded, and the increased rigidity at higher temperatures reduces or eliminates slumping when baking a pie dough of made by the present invention.

The following Examples are intended to show certain embodiments of the present invention and are not to be construed as limitations on the scope of this invention.

EXAMPLE I

Preparation of "–2% Emulsion" Pie Dough

A water based slurry was prepared by combining the ingredients listed under "Slurry Composition" in Table I below. An in-line homogenizer/mixer/blender setup was used. The slurry ingredients were mixed in a Breddo Likwifier™, available from Breddo Corp., a division of American Ingredients Co. of Kansas City, Kans., for about 300 seconds or until the ingredients are sufficiently blended. The slurry temperature was about 22° F. The slurry was added to melted lard at a temperature of about 120° F. in the amount shown in Table I below, which was then emulsified with the slurry at a speed of about 2000 rpm or other speed sufficient to emulsify the ingredients for about 5 seconds or until the ingredients are thoroughly emulsified, followed by the application of a vacuum on the dough after being mixed to eliminate substantially all the air trapped within the emulsion. The resulting emulsion temperature was about 85° F. The preblend ingredients were combined and placed in the bottom of a Stephan mixer, available from Stephan Processing Technology of Columbus, Ohio. The preblend temperature was about –56° F. The emulsion was poured into the Stephan mixer and mixed with the preblend for about 35 seconds to form the pie dough. The final dough temperature was about 60° F. By "–2% emulsion" is meant a pie dough containing 2% more preblend, by weight, than the control dough.

Preparation of "–4% Emulsion" Pie Dough

A pie dough containing 4% more preblend than the control dough was prepared with ingredients in the amounts listed in Table I. The ingredients were combined in the same manner as in the "–2% Emulsion" dough described above, but had slightly different initial and final temperatures due to the change in formulation. The lard, at a temperature of about 120° F. was emulsified with the slurry, having a temperature of about 30° F., resulting in an emulsion having a temperature of about 90° F. The emulsion was added to the preblend having a temperature of about –28° F., and the resulting dough had a temperature of about 60° F.

Preparation of Control Dough

A control dough was prepared using conventional methods. The lard and preblend ingredients were combined in the amounts shown in Table I in a Stephan mixer. The lard was added at a temperature of about 125° F. and the preblend was added at a temperature of about –35° F. The lard and preblend were mixed for about 5 seconds and then subjected to a vacuum to eliminate substantially all the air trapped in the mixture. A water-based slurry was prepared with the ingredients listed below in Table I. The slurry, at a temperature of about 30° F., was added to the lard-preblend mixture, and the entire combination was subjected to a vacuum and then mixed for about 50 seconds. The resulting dough had a temperature of about 53° F. A comparison of ingredients for a conventional dough and examples of the emulsion doughs of the present invention is shown in the Table I shown below.

TABLE I

|  | –2% EMULSION % | CONTROL % | –4% EMULSION % |
| --- | --- | --- | --- |
| INTERMEDIATE COMPONENTS |  |  |  |
| PREBLEND | 55.6 | 53.6 | 57.6 |
| SLURRY | 17.6 | 18.4 | 17.0 |
| LARD | 26.8 | 28.0 | 25.4 |
|  | 100% | 100% | 100% |
| PREBLEND COMPOSITION |  |  |  |
| FLOUR | 45 | 45 | 45 |
| WHEAT STARCH | 55 | 55 | 55 |
|  | 100% | 100% | 100% |
| EMULSION COMPOSITION |  |  |  |
| LARD | 60 | — | 60 |
| SLURRY | 40 | — | 40 |
|  | 100% |  | 100% |
| SLURRY COMPOSITION |  |  |  |
| WATER | 90.55 | 90.55 | 90.55 |
| SALT | 6.80 | 6.80 | 6.80 |
| XANTHAN GUM | 1.05 | 1.05 | 1.05 |
| ADDITIONAL INGREDIENTS | 1.60 | 1.60 | 1.60 |
|  | 100% | 100% | 100% |

EXAMPLE II

Rheological Evaluation

The pie doughs prepared in accordance with the present invention were evaluated for rheological characteristics, using small-amplitude oscillatory shear. The rheological properties were measured using a Rheometric Fluid Spectrometer, available from Rheometric Scientific, Inc. of Piscataway, N.J. The spectrometer included testing cells. The testing cells included two 25 millimeter diameter plates, an upper stationary plate and a lower rotating plate. The small-amplitude oscillatory shear properties of the pie doughs were measured by positioning a dough sample between the plates, contacting both plates.

To prepare the dough for testing, the dough was cut into a 25 mm diameter disk about 2 mm in height and placed between the two 25 mm diameter plates spaced about 2 mm apart. To minimize dough slippage between the disks, the plates used were radially serrated. The oscillation frequency of the lower rotating plate was set at 10 radians/second with a torque transducer of 20 gram-centimeters and the maximum strain amplitude was 0.2%.

The dough was allowed to equilibrate at a temperature of about 5° C. for ten minutes. Following equilibration, the temperature was increased at a rate of 1° C./minute until a final temperature of 90° C. was reached. At each temperature increment, the rheological properties were measured with the spectrometer. A quantity, complex viscosity, n*, was also measured. Complex viscosity is equal to $2hM/\pi R^4 w\theta$. The quantity "h" is the actual distance between the plates. The quantity M is the measured sensor torque. The quantity "R" is a radius of the dough sample, about 12.5 millimeters. The quantity "w" is oscillation frequency, which is 10 rad/sec. The quantity "θ" is the strain to which the dough sample is subjected. The quantity G' is an elastic modulus equal to $n*w \cos \phi$, and has units dyne/cm². A quantity G" is a viscous modulus equal to $n*w \sin \phi$, and has units dyne/cm². $\phi$ is a phase angle and indicates the degree out of phase during the sine wave oscillation. If $\phi=0$ degrees, it means that the material is 100% elastic, very solid-like. If $\phi=90$ degrees, the material is 100% viscous, very liquid-like. For a viscoelastic material such as dough, $\phi<0<90$ degrees. $\phi$ is a function of temperature for pie dough.

Figure 2:
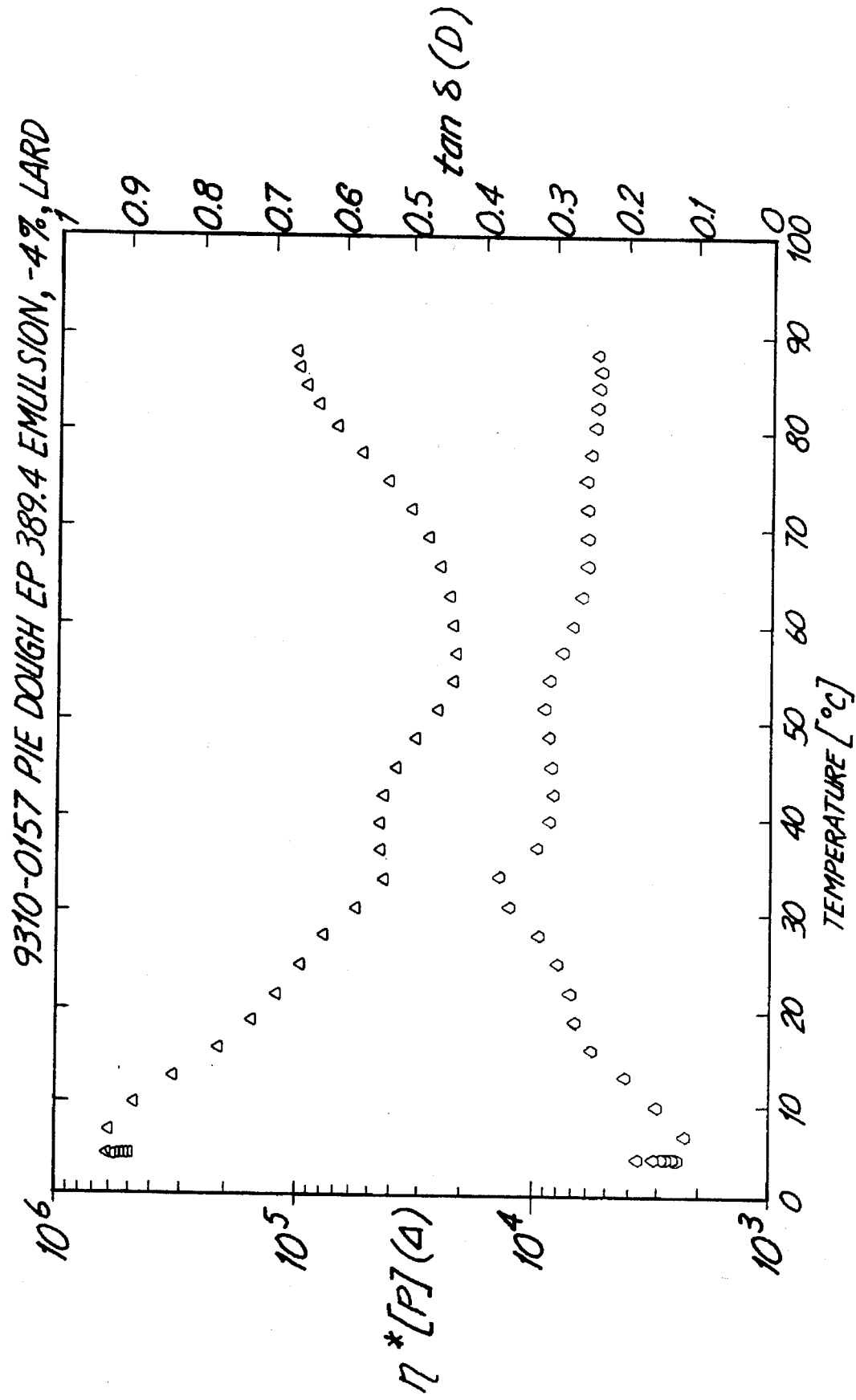
FIG. 2 shows a graphical view of viscosity versus temperature for a –4% emulsion pie dough of the present invention made with lard.
Figure 3:
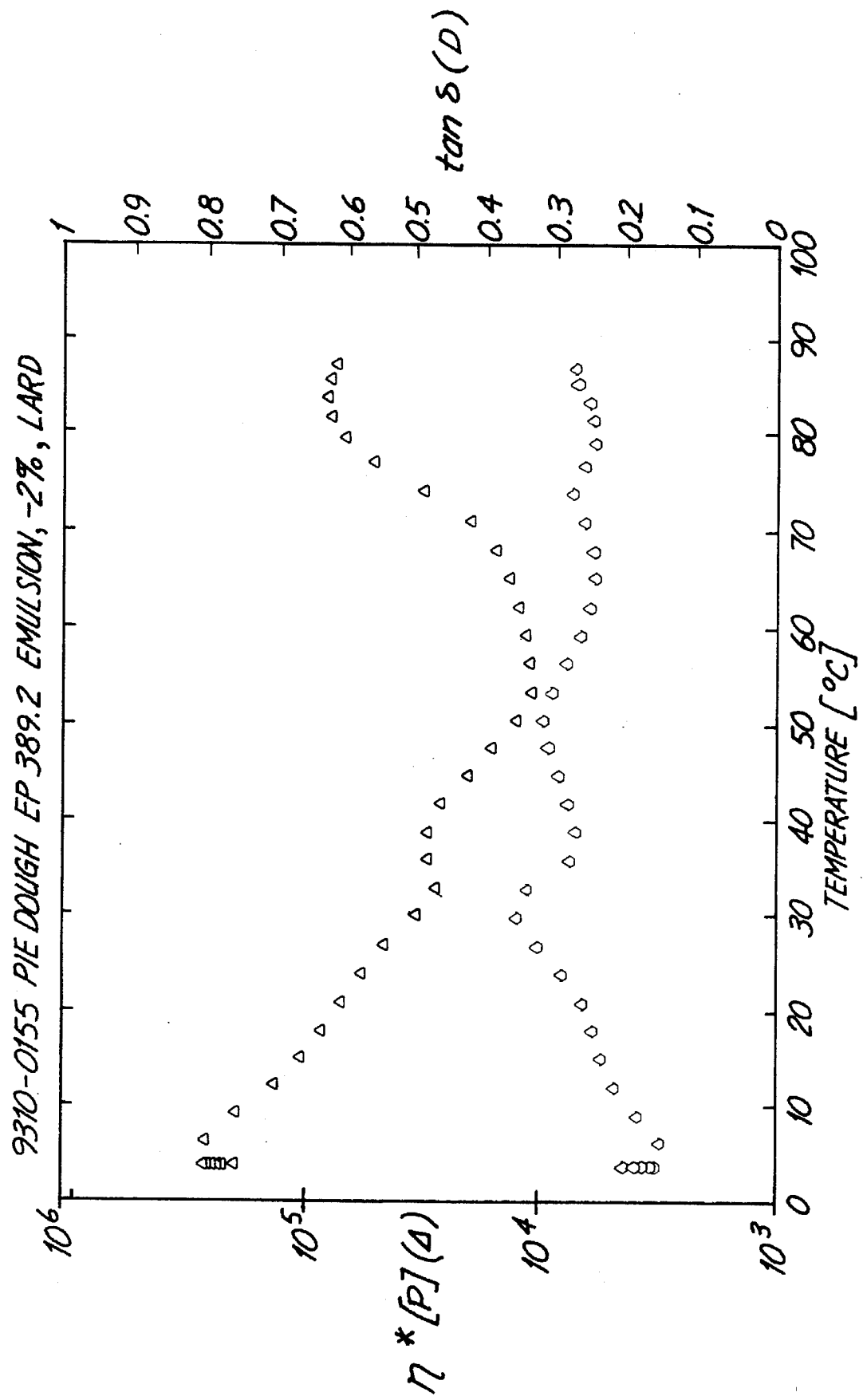
FIG. 3 shows a graphical view of viscosity versus temperature for a –2% emulsion pie dough of the present invention made with lard.
Figure 4:
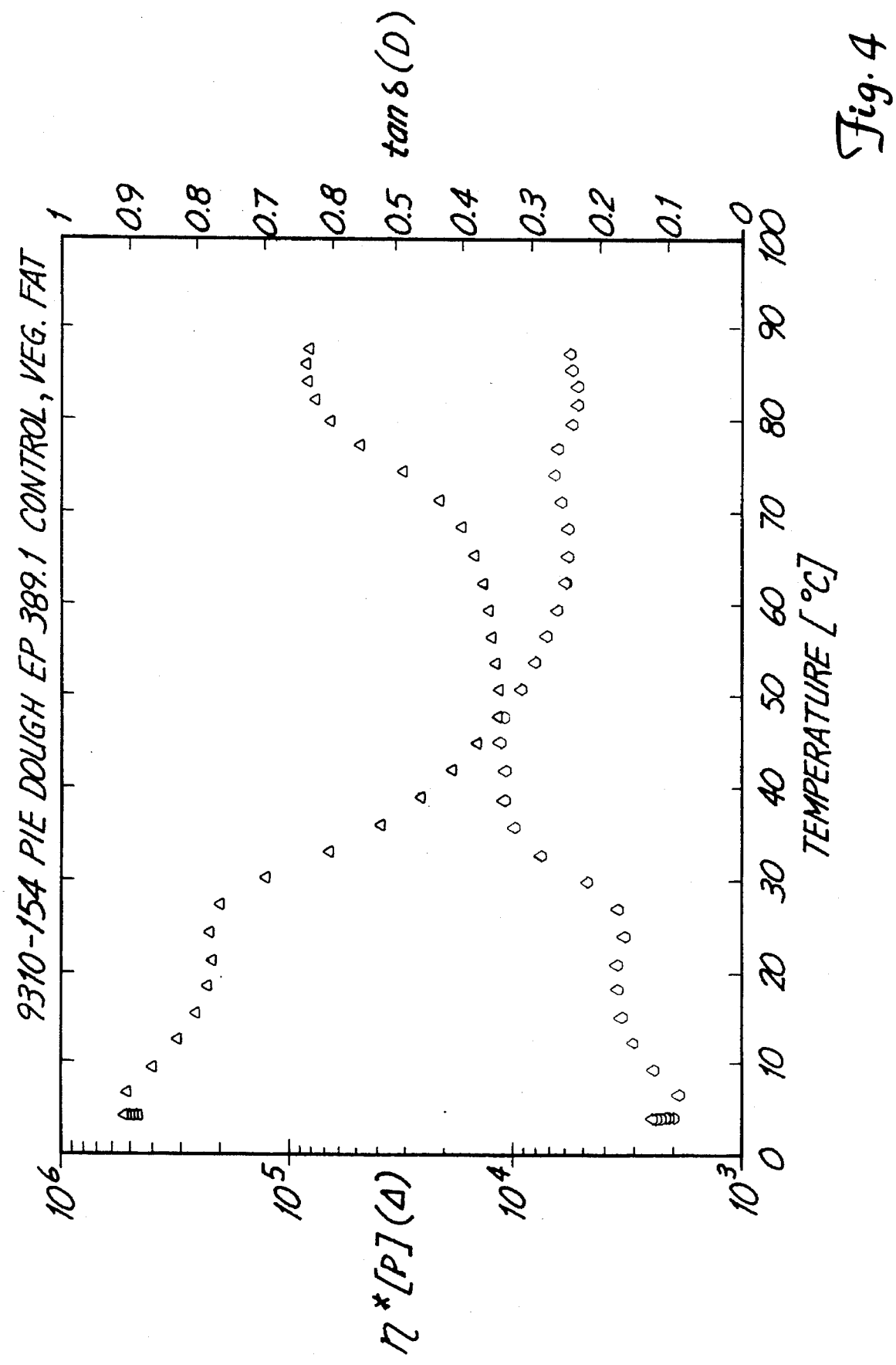
FIG. 4 shows a graphical view of viscosity versus temperature for a control pie dough made with vegetable shortening.

The results are shown in FIGS. 1–5. The upper plot in each Figure is n* versus temperature. The lower plot is the tangent of $\phi$ versus temperature. FIG. 1 is a control dough, made with lard in accordance with the example described. FIGS. 2 and 3 are emulsion doughs, made with lard. FIG. 4 is a control dough made with vegetable shortening. FIG. 5 is an emulsion dough made with vegetable shortening.

It is believed that because the emulsion pie doughs made by the method of the present invention have lower viscosity values, designated as n*, at lower temperatures as compared to a control dough, and higher n, values at higher temperatures than a control dough, both cracking and slumping are reduced.

Cracking was measured by unfolding the dough at refrigeration temperatures, typically less than 45° F. and measuring any cracks that appeared upon unfolding.

Slump was measured by a slumpometer such as is described in Schanno patent, U.S. Pat. No. 5,270,065, which is herein incorporated by reference. The slumpometer was equipped with a 16 gauge stainless steel with a slope of 50 degrees attached to a metal base of the slumpometer. In addition to the slumpometer, equipment used included a two inch by five inch rectangular template, a knife or razor blade with a handle, a 450 degree baking oven and a metric ruler.

To test a dough sample, the sample was equilibrated to a temperature of 55 degrees Fahrenheit in a water bath for at least one-half hour. The pie dough was then unfolded. The crust was not floured. Four two by five inch strips from the crust were cut with the template and a knife in the pattern shown in the Schanno patent. A strip was placed on the slumpometer so that the top of the strip was flush with the slumpometer "starting line." Each strip was positioned straight so that sideways slumping did not occur. Other strips were placed on the slumpometer allowing ¼ inch space between strips.

The procedure was repeated for another sample to make eight strips in total. When eight strips were in position, the slumpometer was placed in an oven preheated at 450 degrees for 10 minutes. The slumpometer was then removed in the oven and cooled for 10 minutes. The distance from the top of each strip to the "starting line" of the slumpometer was measured in millimeters. The average millimeters slump was calculated from the eight samples.

Because the pie dough of the present invention has a reduced viscosity at processing temperatures, it is less susceptible to cracking when unfolded by the consumer, even after storage including freezing and subsequent refrigeration. This reduced viscosity is surprising since the pie dough of the present invention contains less moisture than a conventional pie dough, which would normally result in a more rigid dough. It is believed that the emulsification step permits more uniform distribution of the fat and water emulsion throughout the dough, resulting in an overall more deformable dough which is more resistant to cracking.

It was also discovered that a pie dough made by the method of the present invention had a higher viscosity at baking temperatures than a conventional pie dough, probably due to the reduced water and fat contents. The more rigid crust structure results in the reduction or elimination of slump when baking a pie dough of the present invention. Preferably, the viscosity of the pie dough at about 10° C. is less than about $4\times10^5$ poise.

The viscosity shift that occurs in pie doughs between about 50° C. and 60° C. is also affected by using the method of the present invention. It was found that by using the emulsion method to prepare a pie dough, the viscosity shift was not as sharp as in conventional pie doughs, which reduces or eliminates cracking and slump in the dough. Preferably, the viscosity of the dough between about 50° C. and 60° C. is above about $2\times10^4$ poise. It was discovered that viscosity shifts occurring in this temperature range above about $2\times10^4$ poise result in the reduction or elimination of slump during baking.

EXAMPLE III

Rheological Evaluation of Example I Doughs

Using the method described in Example II, the following data were collected. The elastic modulus, G', is directly correlated to viscosity by the following equation:

TABLE II

| Pie Dough | G' (dyn/cm²) at 62° F. | Cracking (mm) |
| --- | --- | --- |
| Control | $2.5 \times 10^6$ | 23 |
| Emulsion (@ −2%) | $9.2 \times 10^5$ | 14 |
| Emulsion (@ −4%) | $2.0 \times 10^6$ | 23 |

TABLE III

| Pie Dough | G' (dyn/cm²) at 140° F. | Slump (mm) |
| --- | --- | --- |
| Control | $1.2 \times 10^5$ | 31 |
| Emulsion (@ −2%) | $1.3 \times 10^5$ | 29 |
| Emulsion (@ −4%) | $2.4 \times 10^5$ | 14 |

From this data it was observed that the −2% emulsion dough had the least amount of cracking of the doughs tested. The −4% emulsion dough had the least amount of slump, surprisingly less than half of the control dough, but had a similar processing and handling rheology as the control dough. The −4% emulsion also exhibited no greater extent of cracking than the control dough.

EXAMPLE IV

Sensory Evaluation of Pie Doughs

Eating quality and appearance characteristics of a crust baked from a pie dough made by the emulsion method and the control method were compared after the dough had been stored under refrigerated conditions for 90 days. Control samples made with a vegetable oil were prepared. 2% emulsion samples were also prepared. The control made with vegetable shortening was prepared so that the pre-blend was at a temperature of −20° F. The vegetable shortening temperature was 121° F. The slurry temperature was 22° F. and the dough temperature was 56° F. For the 2% vegetable shortening emulsion dough, the pre-blend temperature was −30° F. The emulsion temperature was 84° F. The dough temperature was 56° F. The emulsion dough had a consistency that was flowable in the manner of slightly-whipped egg whites. It was found that the vegetable shortening was feasible using the emulsion approach. For the −2% emulsion pie dough, both filled pies and unfilled crusts were tested. The pie doughs made by the method of the present invention were baked for about 12 minutes at 375° F. to obtain the desired degree of brownness, while the conventional pie doughs were baked for 10 minutes at 375° F. The control and the −2% emulsion-based crust, as evaluated by a trained sensory panel, had identical color, identical flaky appearance and eating qualities, and had similar tenderness in both the filled and unfilled pie crusts. A cherry-filled pie with a crust made from a dough of the present invention had a 2:1 overall preference rating by the panel compared to the control crust.

In another test, crust sogginess was evaluated. A control crust and a crust baked from a −4% emulsion based dough were filled with a canned cherry pie filling, to which about 50% more water had been added. The pie doughs were placed in aluminum pans and overfilled with the cherry filling, then baked at 375° F. for 40 minutes. The resultant crusts were observed for soggy or wet areas. The control crust had soggy or wet areas covering about 20% of the total area of the crust, while the emulsion based crust had soggy or wet areas covering only about 5% of the total area of the crust.

It is believed that the emulsion based crust is more resistant to becoming soggy or wet due to the more uniform distribution of the fat in the dough. During baking, the fat in the pie dough melts and may form a relatively uniform barrier over the remaining dough ingredients, preventing water from the filling from migrating into the dough as it bakes.

EXAMPLE V

All-vegetable shortening pie dough

Control and −2% emulsion based doughs were prepared in accordance with Example I, except an all vegetable based shortening was used as the shortening. The vegetable shortening had a concentration that was the same as the lard. The vegetable shortening doughs were prepared in the same manner as the −2% emulsion lard dough described in Example 1.

The viscosity of the control dough made with vegetable shortening is shown in FIG. 4. The viscosity of a −2% emulsion dough prepared with vegetable dough is shown in FIG. 5. The viscosity of the vegetable shortening emulsion doughs shows the same characteristics as the viscosity of lard emulsion doughs. The −2% emulsion dough made with all vegetable fat did not crack as much as the control dough. One additional benefit of the vegetable shortening emulsion doughs is that these doughs are free of cholesterol.

Although the present invention has been described with reference to preferred embodiments, workers skilled in the art will recognize that changes may be made in form and detail without departing form the spirit and scope of the invention.

What is claimed is:

1. A method for making a pie dough having a deformability at ambient temperatures effective to prevent cracking and having a deformability at baking temperatures effective to prevent slumping, comprising:

providing a quantity of fat of a concentration effective to make a pie dough;

preparing a slurry comprising water;

emulsifying the slurry and fat to make an emulsified mixture;

adding the emulsified mixture to a blend comprising flour; and mixing the emulsified mixture and the blend.

2. The method of claim 1 wherein the emulsified mixture and blend are mixed for at least about 50 seconds.

3. The method of claim 2 and further including shaping the dough to form a pie crust.

4. The method of claim 3 and further including baking the pie crust at least about 350° F.

5. The method of claim 1 wherein the emulsion has a temperature of between about 75°–95° F. when added to the blend.

6. The method of claim 1 wherein the blend has a temperature of between about −50° to 0° F. when the emulsion is added.

7. A product made by the process of claim 1 that is resistant to cracking at ambient temperatures and that is substantially free of slump at baking temperatures.

8. A tender baked pie crust made from the dough of claim 7 that is substantially free of cracks and slumping comprising a fat concentration of between about 15% to 30% by weight.

9. The product of claim 7 and further comprising salt.

10. The product of claim 7 and further comprising wheat starch.

11. The product of claim 7 wherein the fat comprises at least one or more of lard, shortening and vegetable shortening.

* * * * *

UNITED STATES PATENT AND TRADEMARK OFFICE
CERTIFICATE OF CORRECTION

PATENT NO. : 5,595,778
DATED : January 21, 1997
INVENTOR(S) : Victor T. Huang, et al It is certified that error appears in the above-indentified patent and that said Letters Patent is hereby corrected as shown below:

Col. 7, line 5, after the word "that", delete the ".";

Col. 9, line 29, after the letter "n", delete the ",", insert the symbol --*--.

Signed and Sealed this

Eighth Day of July, 1997

Attest:

BRUCE LEHMAN

Attesting Officer          Commissioner of Patents and Trademarks